(No Model.)
H. L. BURRILL.
CAR SEAL.
No. 557,964. Patented Apr. 7, 1896.
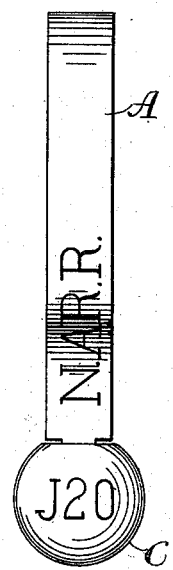
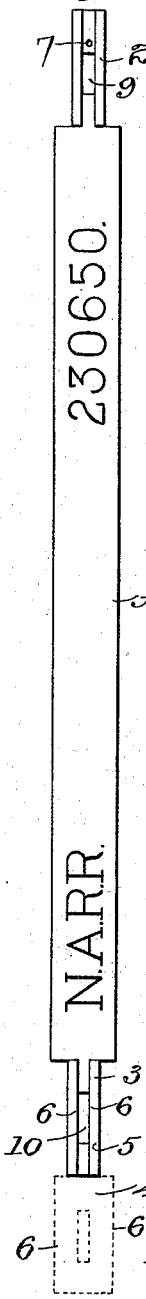
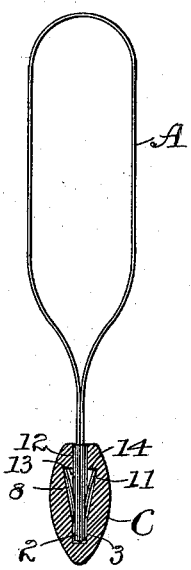
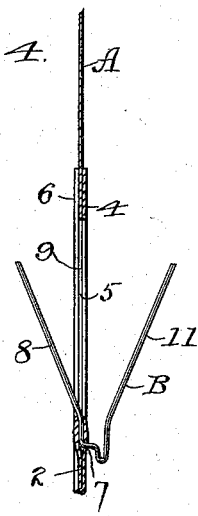
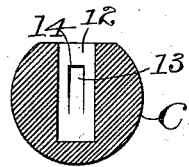
Witnesses:-
C. F. Caldwell
H. S. Johnson
Inventor:-
Harry L. Burrill,
per Paul & Merion,
Attorneys.

UNITED STATES PATENT OFFICE.

HARRY L. BURRILL, OF ST. PAUL, MINNESOTA.

CAR-SEAL.

SPECIFICATION forming part of Letters Patent No. 557,964, dated April 7, 1896.

Application filed August 30, 1892. Serial No. 444,534. (No model.)

*To all whom it may concern:*

Be it known that I, HARRY L. BURRILL, of St. Paul, Ramsey county, Minnesota, have invented certain new and useful Improvements in Car-Seals, of which the following is a specification.

My invention relates to improvements in car-seals; and it consists in providing a frangible locket or seal having a narrow socket with recesses or pockets in the opposite side walls. I also provide a sealing-strip, the ends of which are adapted, when closed together, to enter said socket and fill the throat of the same and are provided with barb-shaped springs, the ends of which are compressible into grooves or slots in the strip, so as to be within the strip, whereby they can enter the socket of the locket, being compressed by the side walls of its throat, and will spring outward from the strip and engage the recesses or pockets in the side walls of the socket and thus secure the strip in the locket. These springs may be made of any suitable material and either inserted into the strip, as hereinafter described, or formed integral therewith.

My invention further consists in the specific construction and combination hereinafter described, and particularly pointed out in the claims.

In the accompanying drawings, forming part of this specification, Figure 1 is a front elevation of my improved car-seal shown in a locked or sealed position. Fig. 2 is a side elevation of the same shown in partial cross-section. Fig. 3 is a detail of the strip, showing how the necks at the end of same are doubled. Fig. 4 is a detail showing how the spring is secured in the strip, and Fig. 5 is a longitudinal section of the locket in which the strip is secured.

In the drawings, A represents the sealing-strip, of tin or other flexible material, having near each end the narrowed portion or neck, numbered, respectively, 2 and 3. The end 4 of the strip beyond the neck is turned back upon the neck, its edges 6 being turned over the edges of the neck, forming the hems 5, thus strengthening and reinforcing it. In one of the ends of the strip is formed the slot 9 and in the other the slightly-longer slot 10. Beyond the slot 9 is provided the hole 7 in one layer of the strip, through which is inserted the V-shaped spring B, one member, 8, of which passes between the two layers into the slot 9 and is outturned. When the strip is doubled upon itself to bring the ends together, the other member, 11, of the spring is passed through the slot 10 in the other end of the strip, the two members of the spring thus forming barbs upon the closed ends of the strip.

C is a locket, formed of clay or other frangible material, having a socket 12 of sufficient width only to receive the closed ends of the strip, and provided with pockets 13 on each side, terminating in the shoulders 14, against which the members of the spring abut when inserted in the socket. The strip and face of the locket may be stamped with any designating mark, as may be desired.

Operation: The car-door pin having been inserted in place, the strip A is passed through the same and its ends 2 and 3 closed together and inserted in the opening in the locket, the side walls of which compress the members of the spring into the body of the strip, lying in the grooves 9 and 10, until carried into the socket and the ends of the members pass the shoulders 14, when they spring outward into the pockets 13 and abut against the shoulders, thus automatically locking the strip and preventing its withdrawal without breaking the locket or the strip. The strip is removed by breaking the locket and can be used again by inserting into a new locket without the necessity of using a new sealing-strip.

I claim—

1. In a car-seal, the combination with the frangible locket socketed to receive the ends of a sealing-strip, of a bifurcated spring or clasp permanently secured in one end of said strip with one of its prongs passing freely through the other end of the strip, and sockets formed in the inner face of said socket to receive the prongs of said spring or clasp to hold the strip locked in said socket.

2. In a device of the class described, the combination with the frangible locket, having a narrow-throated socket, of the shouldered inclined recesses in the side walls of said socket, the flexible sealing-strip, the double-barbed spring-catch passing through both ends of said sealing-strip and locking them together inside said socket, the ends of said spring when inserted into said socket expanding outward into said recesses and engaging said shoulders, and substantially filling said socket.

3. In a car-seal, the combination with the frangible locket socketed to receive the ends of a sealing-strip, of the barb-spring having one member permanently secured in one end of said sealing-strip, the other member passing freely through the other end thereof and having a downturned bend engaging with the end of the sealing-strip and preventing its being disengaged from the other end of the strip when inserted into the socket.

In testimony whereof I have hereunto set my hand this 25th day of August, 1892.

HARRY L. BURRILL.

In presence of—
C. L. CALDWELL,
H. S. JOHNSON.